United States Patent
Bucksch

(10) Patent No.: US 7,004,105 B2
(45) Date of Patent: Feb. 28, 2006

(54) CONTAINER WITH A DEVICE FOR INDICATING A TOTAL QUANTITY OF FLUID

(76) Inventor: Helmut Bucksch, Am Honigbirnbaum 24, Bad Soden (DE) 65812

( * ) Notice: Subject to any disclaimer, the term of this patent is extended or adjusted under 35 U.S.C. 154(b) by 0 days.

(21) Appl. No.: 10/825,263

(22) Filed: Apr. 15, 2004

(65) Prior Publication Data

US 2004/0237878 A1 Dec. 2, 2004

(30) Foreign Application Priority Data

May 25, 2003 (DE) ............................ 103 23 996

(51) Int. Cl.
*G01F 23/00* (2006.01)
(52) U.S. Cl. ................. 116/227; 116/306; 116/321; 116/DIG. 3; 33/1 V; 33/679.1
(58) Field of Classification Search .......... 116/DIG. 1, 116/DIG. 3, DIG. 32, 204, 227, 306, 307, 116/308, 309, 317, 318, 321, 322, 323, 324; 206/459.1; 215/230, 365, 366; 222/23, 222/25, 26; 73/426, 427, 428; 33/DIG. 1, 33/1 V, 679.1, 483, 347, 494
See application file for complete search history.

(56) References Cited

U.S. PATENT DOCUMENTS

| | | | | |
|---|---|---|---|---|
| 388,677 A | * | 8/1888 | Hayes | 116/308 |
| 675,364 A | * | 5/1901 | Burton | 116/308 |
| 1,651,485 A | | 12/1927 | Thesen | |
| 3,574,957 A | | 4/1971 | Bello-Bridick | 35/76 |
| 3,766,882 A | | 10/1973 | Babbitt, III. | 116/308 |
| 3,777,697 A | * | 12/1973 | Woessner | 116/227 |
| 3,818,858 A | | 6/1974 | Kramer et al. | 116/308 |
| 4,405,045 A | | 9/1983 | Villa-Real | 206/534 |
| 4,528,933 A | | 7/1985 | Allen | 116/308 |
| 4,550,602 A | * | 11/1985 | Burke et al. | 116/227 |
| 4,639,251 A | * | 1/1987 | Kirkland | 116/227 |
| 4,860,684 A | * | 8/1989 | Al-Harbi | 116/308 |
| 4,877,119 A | | 10/1989 | Hosking | 206/459.1 |
| 5,038,606 A | * | 8/1991 | Geschwender et al. | 73/427 |
| 5,356,012 A | | 10/1994 | Tang et al. | 206/534 |
| 5,400,907 A | * | 3/1995 | Chen | 206/459.1 |
| 5,482,163 A | | 1/1996 | Hoffman | 206/534 |
| 5,607,078 A | * | 3/1997 | Nordberg et al. | 116/227 |
| 5,839,581 A | | 11/1998 | Vagedes | 206/459.1 |

(Continued)

FOREIGN PATENT DOCUMENTS

AT    53857    6/1912

(Continued)

OTHER PUBLICATIONS

Bucksch, Pending U.S. Appl. No. 10/111,020, entitled "Drinking Container with Device for Indication a Quantity of Drink",filed Apr. 19, 2002.

(Continued)

*Primary Examiner*—Diego Gutierrez
*Assistant Examiner*—Travis Reis
(74) *Attorney, Agent, or Firm*—Davidson, Davidson & Kappel, LLC

(57) ABSTRACT

A fluid container includes a vessel for holding a fluid, a marker element, and a scale element. The scale element has a scale for indicating a total quantity of the fluid. The marker element and the scale element are adjustable relative to each other to enable an adding up of amounts of fluid and thereby indicate the total quantity of the fluid. The marker element and the scale element are held together by magnetic force and may be detached from each other.

20 Claims, 2 Drawing Sheets

U.S. PATENT DOCUMENTS

| | | | | |
|---|---|---|---|---|
| 5,845,777 | A | 12/1998 | Najmi | 206/459.1 |
| 5,896,990 | A | 4/1999 | Barzana | 206/459.1 |
| 6,089,180 | A | 7/2000 | Nichols, Jr. | 116/309 |
| 6,244,456 | B1 * | 6/2001 | Hanlon | 116/307 |
| 6,575,336 | B1 * | 6/2003 | Bayer | 116/227 |
| 6,736,536 | B1 * | 5/2004 | Jacobs et al. | 206/221 |
| 2003/0192468 | A1 * | 10/2003 | Goertzen | 116/309 |

FOREIGN PATENT DOCUMENTS

| | | |
|---|---|---|
| AT | 400507 B | 1/1996 |
| CH | 35298 | 1/1906 |
| DE | 70311 | 9/1892 |
| DE | 114179 | 11/1899 |
| DE | 1924280 | 6/1965 |
| DE | 2731395 | 1/1979 |
| DE | 297 02 741 U | 8/1997 |
| DE | 200 14 688 U | 12/2000 |
| DE | 199 51 466 | 5/2001 |
| DE | 10136236 | 2/2003 |
| EP | 0788397 | 12/2000 |
| FR | 2543676 A1 * | 10/1984 |
| FR | 2756918 | 6/1998 |
| GB | 2332897 | 7/1999 |
| WO | 0130210 | 5/2001 |

OTHER PUBLICATIONS

European Search Report for EP 1 481 620 A1, Jul. 28, 2004 (1 page); and brief translation thereof (1 page).

* cited by examiner

CONTAINER WITH A DEVICE FOR INDICATING A TOTAL QUANTITY OF FLUID

Priority is claimed to German patent application DE 103 23 996.0, the subject matter of which is hereby incorporated by reference herein.

The invention relates to a container with a device for indicating a total quantity of fluid which can be bigger than the volume of the container, where the device is equipped with a scale element with a scale for the total fluid quantity and a marker element adjustable relatively to each other.

BACKGROUND

International Patent Document No. WO 01/30210 A1 of the applicant describes drink containers with a filling scale and a device for indicating the total quantity of drink. This device is equipped with a rotary element which can be attached to and also be detached from the drink container and rotated around the drink container. The mechanical implementations and clamping devices required for this may be costly and difficult to manufacture.

German Patent Document No. DE 101 36 236 A1 describes a device which can be attached to drink containers. The device consists of an elastic curved element which is equipped with a scale for a total quantity of drink and a marker element movable along the scale. The marker element is connected with the elastic curved element by means of resilient clips. This arrangement is costly and difficult to manufacture.

In drink containers of the above kind, the rotary or slidable elements to indicate the total quantity of drink are mechanically connected with the respective drink container by means of complicated and costly mechanic elastic fixings or clamping mechanisms.

SUMMARY OF THE INVENTION

It is an object of the present invention to provide a container with a device for indicating a total fluid quantity which is easy to manufacture.

The present invention provides a fluid container including a scale element and a marker element which are detachably connected with each other by magnetic force. In order to achieve this, according to an embodiment, either the scale element or the marker element is equipped with a magnet or consist of a magnet, preferably a permanent magnet. The other element is then equipped with magnetic material or consists of magnetic material. By rotating the scale and marker elements relative to each other, it is possible to adjust the marker to a respective quantity of drink. A filling scale may be provided for indicating a respective quantity of drink added to the container in one drink-adding event, whether the container is filled or partially-filled. By further rotating the scale and marker elements relative to each other after each drink-adding and/or drinking through a respective amount indicated on the scale element corresponding to an amount indicated on the filling scale it is possible to add up a total fluid intake, for example a daily fluid intake.

In this application, magnetic material is meant to be a material that is, although attracted by a magnet, no magnet itself, as for example soft-magnetic or para-magnetic materials. Both elements can also be provided with at least one magnet with suitable polarity or can consist of magnets with suitable polarity, preferably permanent magnets.

A suitable magnet can be made of known magnet materials, such as samarium-cobalt, neodymium-iron-boron, or of ceramic material, in particular hardferrite, which is resistant against many chemicals, solvents, diluted acids, etc. The magnet can be made as a disc magnet, ring magnet, or in other form and can also consist of several single magnets.

BRIEF DESCRIPTION OF THE DRAWINGS

Further details and advantages of the present invention will be explained based on exemplary embodiments with reference to the drawings, in which.

Figure 1:
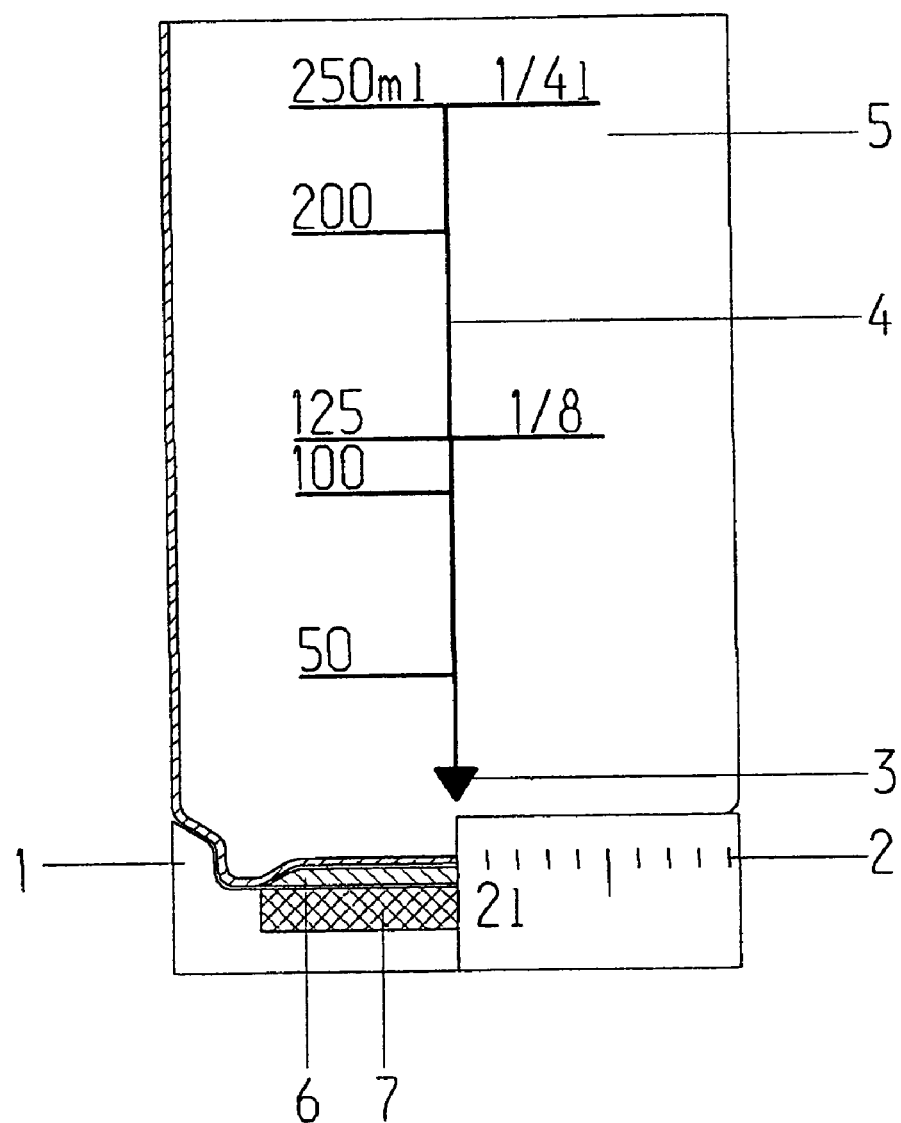
FIG. 1 shows schematically a first embodiment of a drink container.

In a container according to an embodiment of the invention, the scale element consists of a rotary element with a scale for the total fluid quantity, attached to the container. The container is provided with a marker. By this, the container represents a marker element. The marker can, of course, also be attached to the rotary element. The marker is rotatable relative to the scale for the total fluid quantity attached to the container. In this case, the rotary element is the marker element and the container the scale element. According to invention, the scale element and the marker element are detachably connected with each other by magnetic force.

An iron backing disc may be installed at the foot of the container as holding plate. The iron backing disc can also be cast into the foot of the container. The rotary element, e.g. a ring or cap that can be attached from below to the foot of the container, is then equipped with a permanent magnet, acting as holding magnet. This magnet and the iron backing disc together form a holding system which provides sufficient holding forces to hold the rotary element tight to the container. Vice versa, it is of course possible that a permanent magnet is attached to or casted into the container, and the rotary element can carry the iron backing disc or consist of a magnetic material. When exceeding the holding force of the magnet system, e.g. by detaching the rotary element, the connection is disrupted trouble-free. This magnet system therefore enables manufacturing detachable connections, which can be handled quickly and securely. The magnet can also be made in the form of the rotary element, and for example, can be provided with a plastic coating, on which the scale for the total fluid quantity or the marker is attached.

In order to increase the holding forces of the magnet system, the magnet can be equipped with a second iron backing disc, so that the magnet is located between the two iron backing discs, when the rotary element is attached to the container. In a preferred embodiment of a container according to invention, the rotary element is made of plastic with several single magnets and the second iron backing disc embedded.

By choosing an appropriate rubber or latex-like soft plastic and the number and power of the single magnets, the frictional coefficient between the frictional surfaces of the scale and marker element can be determined and by this the desired twist resistance be produced. The frictional surfaces can be slightly geared or provided with ridges or teeth, so that the rotary element is rotatable step-by-step, whereas the range of the steps is preferably adapted to the graduation of the scale for the total fluid quantity.

The container can be made of glass, plastic, or another suitable material. The foot of the container is made in such a way that the frictional surfaces of the scale and marker element touch each other without any air gap. If the foot of a glass container which shows relatively large manufacturing tolerances, has, for example, an outer annular projection, the rotary element is made with a corresponding annular recess which can take in the projection, i.e. the scale element and the pertinent marker element are provided with profiles adapted to each other.

By rotating the rotary element, it is possible to adjust the marker to the respective quantity of fluid added, and by rotating the rotary element further after each emptying and adding of fluid to the container, it is possible to add up the total fluid quantity. In case the container does not have a filling scale, the number of filled containers can be added up. When the rotary element is detached, the container can be cleaned as usual, in particular on the spots which are otherwise covered by the rotary element.

In a container according to another embodiment of the invention, the scale element consists of an elastic curved element which is provided with a scale for the total fluid quantity. The elastic curved element has a core of spring steel wire or spring steel that can therefore be clamped at the container due to its spring elasticity. Alongside the scale for the total fluid quantity is a slidable element which serves as marker element. According to invention, the scale element and the marker element are detachably connected with each other by magnetic force.

In a container according to another embodiment of the invention the container is equipped with a scale element in the form of a preferably self-adhesive and flexible magnet strip or sheet that is provided with a, preferably printed-on, scale for the fluid filling quantity, wherein the total fluid quantity to be indicated can be bigger than the volume of the container. In order to increase the holding force, the magnet strip can be attached to a self-adhesive flexible steel strip, which serves as holding surface. The container is furthermore equipped with a marker element which is in particular technically and shape-wise adapted to the scale element, and which consists of magnetic material, but which can also be equipped with a magnet or formed as a magnet. The marker element and the scale element are connected with each other by magnetic force, however, the marker element is slidable alongside the scale for the total fluid quantity to indicate the total fluid quantity. The scale element and the marker element can be provided with a slot and key profile. The profiles provide better holding functions for the marker element and at the same time guidance alongside the scale for the total fluid quantity. The scale element can certainly also be not magnetic. In this case, the marker element is equipped with a magnet or can be formed as a magnet, so that it attracts the scale element. If the container is equipped with a filling scale, it is possible to adjust the respective filling quantity by moving the marker element alongside the scale for the total fluid quantity, and by moving the marker element further after each adding of fluid and emptying of the container, it is possible to add up the total fluid quantity. If the container does not have a filling scale, the number of filled containers can be added up.

Containers according to invention can, for example, also have an assembly in which the scale element and the marker element are detachably connected with each other mechanically. For this purpose, the scale element, for example, is provided with a projection, and the marker element with a groove, or vice versa, in such a way that the projection can snap in the groove. In addition, these elements are according to invention also connected with each other magnetically. By this, a certain resistance to movement can be achieved when the elements are moved to one another, so that it is not so easy to disarrange them unintentionally. An appropriate number and/or power of the magnets provide the desired resistance to movement.

FIG. 1 shows schematically a drink container 5 with a filling scale 4, a marker 3, and an iron backing disc 6 attached to the container 5. A rotary element 1 with a scale 2 for the total fluid quantity and a permanent magnet 7 as part of the rotary element 1 is attached to the container 5 from below, and represents together with the marker 3 a device for indicating a total fluid quantity which can be bigger than the volume of the container. The permanent holding forces of the magnet create a permanent pressure which prevents an unintentional movement of the rotary element 1 to the marker 3. The holding force of the magnet 7 can be varied by an appropriate number and/or power of possibly several single magnets in such a way that the rotary element 1 can easily be attached to the container 5 and can also easily be detached. The permanent magnet 7 and the iron backing disc 6 can be made water resistant. The container 5 is preferably made of glass or a transparent plastic material. The rotary element 1 is made as a cap and consists of an appropriate plastic material or high-grade steel.

Figure 2:
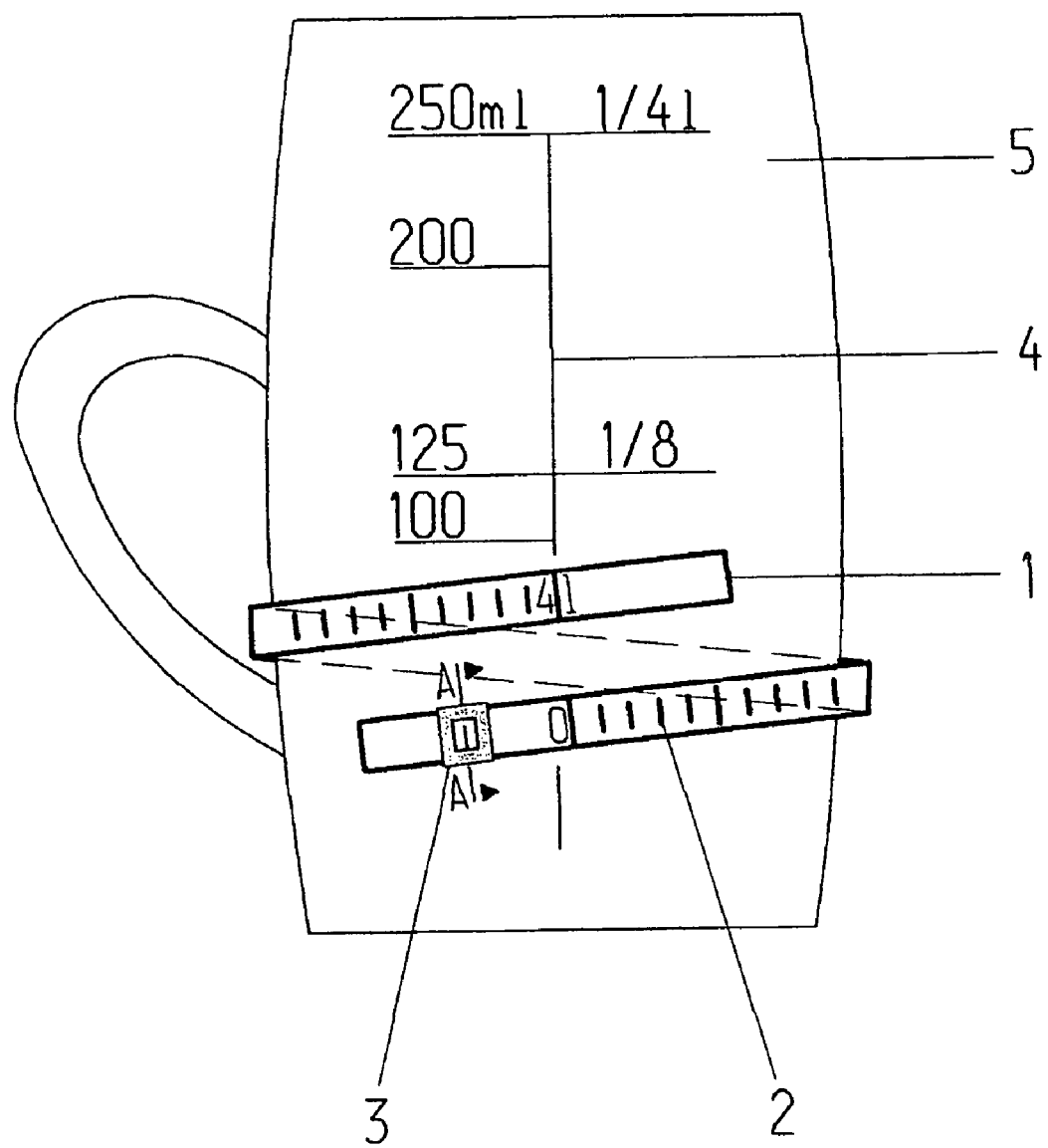
FIG. 2 shows schematically a second embodiment of a drink container.

The drink container 5 described in FIG. 2 is provided with a filling scale 4 and a device for indicating a total quantity of drink. The device consists of a marker element 3 and a scale element 1 in the shape of an elastic curved element with a core of magnetic spring steel or spring steel wire which can be clamped at the drink container 5 because of its elasticity. The marker element 3 can be attached to the scale element 1 and according to invention it is equipped with a magnet or can be formed as a magnet, so that the marker element 3 attracts the scale element 1, but is, however, slidable alongside a scale 2 for the total quantity of drink attached to scale element 1.

What is claimed is:

1. A fluid container comprising:
   a vessel capable of holding a fluid, the vessel including a filling scale;
   a marker element; and
   a scale element including a total quantity scale corresponding to the filling scale, the total quantity scale including a total fluid quantity indication of a fluid quantity greater than a total volume of the vessel;
   wherein the marker element and the scale element are adjustable relative to each other so that the marker element indicates respective positions on the total quantity scale, the marker element and the scale element being detachably disposed relative to each other by a magnetic force.

2. The fluid container as recited in claim 1 wherein:
   the scale element includes a rotary element capable of rotating around the vessel;
   the marker element is disposed on the vessel; and
   the scale element is connected to the vessel by the magnetic force.

3. The fluid container as recited in claim 2 wherein at least one of the vessel and the rotary element includes a magnet.

4. The fluid container as recited in claim 2 wherein at least one of the vessel and the rotary element includes a magnetic material.

5. The fluid container as recited in claim 1 wherein:
   the marker element includes a rotary element capable of rotating around the vessel;
   the scale element is disposed on the vessel; and
   the market element is connected to the vessel by the magnetic force.

6. The fluid container as recited in claim 5 wherein at least one of the vessel and the rotary element includes a magnet.

7. The fluid container as recited in claim 5 wherein at least one of the vessel and the rotary element includes a magnetic material.

8. The fluid container as recited in claim 1 wherein:
the scale element includes an elastic element capable of clamping onto the vessel; and
the marker element is slidable along the scale element.

9. The fluid container as recited in claim 1 wherein:
the total quantity scale includes a metal strip or sheet affixed to the vessel; and
the marker element includes a magnet.

10. The fluid container as recited in claim 1 wherein:
the scale element includes a magnet strip or sheet affixed to the vessel and having a scale thereon configured to indicate the total filling quantity; and
the marker element includes at least one of a magnetic material and a magnet.

11. The fluid container as recited in claim 1 wherein:
at least one of the scale element and the marker element includes a magnet; and
the magnet is coated by a plastic material.

12. The fluid container as recited in claim 1 wherein at least one of the scale element and the marker element includes an iron backing disc.

13. The fluid container as recited in claim 12 wherein the iron backing disc is coated by a plastic material.

14. The fluid container as recited in claim 1 wherein that the scale element and the marker element include respective profiles adapted to each other.

15. The fluid container as recited in claim 1 wherein the scale element and the marker element are detachably connected with each other and each includes a respective mechanical connection.

16. The fluid container as recited in claim 1 wherein:
the scale element includes a projection; and
the marker element includes a groove configured to receive the projection in a snap-in fashion.

17. The fluid container as recited in claim 1 wherein:
the marker element includes a projection; and
the scale element includes a groove configured to receive the projection in a snap-in fashion.

18. The fluid container as recited in claim 1 wherein the scale element and the marker element are rotatably adjustable relative to each other in a step-by-step fashion.

19. A fluid container comprising:
a vessel capable of holding a fluid;
a marker element; and
a scale element including a scale configured to indicate a total filling quantity of the fluid;
wherein the marker element and the scale element are adjustable relative to each other so as to enable an adding up of amounts of fluid so as to indicate the total filling quantity of the fluid, the marker element and the scale element being detachably disposed relative to each other by a magnetic force; and
wherein the scale element includes a magnet strip or sheet affixed to the vessel and having a scale thereon configured to indicate the total filling quantity; and the marker element includes at least one of a magnetic material and a magnet.

20. A method for indicating a total quantity of fluid, the method comprising:
providing a vessel capable of holding a fluid;
providing a scale element including a total quantity scale having a total fluid quantity indication of a fluid quantity greater than a total volume of the vessel;
providing a marker element adjustable relative to the scale element and detachably disposed relative to the scale element by a magnetic force;
adding a first quantity of the fluid to the vessel;
adjusting the marker element relative to the scale element by an amount corresponding to the first quantity;
removing the first quantity of the fluid from the vessel;
adding a second quantity of the fluid to the vessel; and
further adjusting the marker element relative to the scale element by an amount corresponding to the second quantity so as to indicate a total fluid quantity corresponding to the sum of the first and second quantities.

* * * * *